(No Model.) 2 Sheets—Sheet 1.
J. HARTNESS.
CHUCK.
No. 451,711. Patented May 5, 1891.
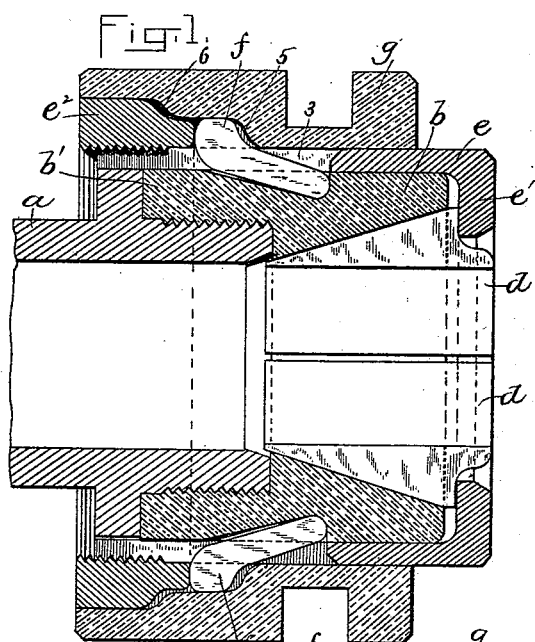
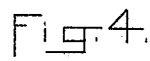
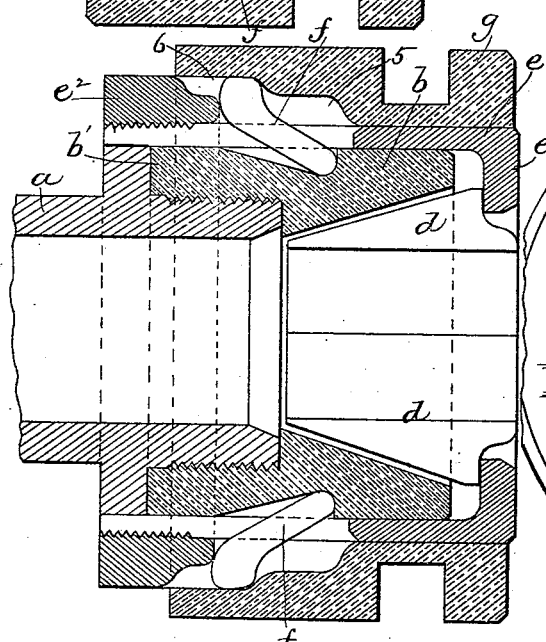
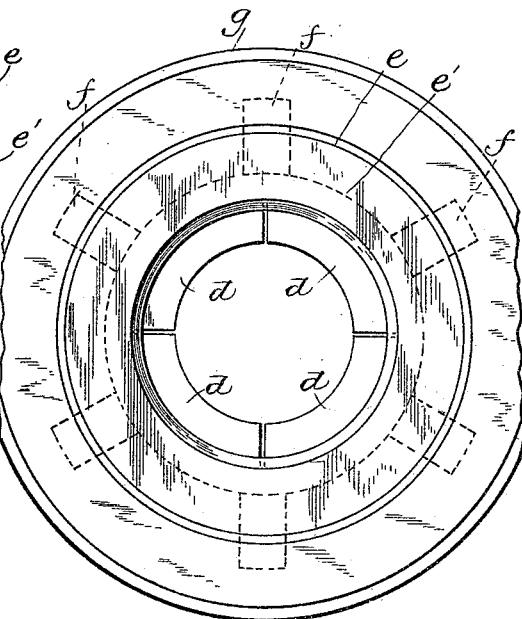
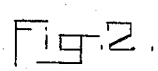
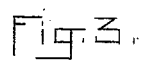
WITNESSES:
INVENTOR:

(No Model.)  2 Sheets—Sheet 2.

J. HARTNESS.
CHUCK.

No. 451,711.  Patented May 5, 1891.

WITNESSES:
O. G. Bartlett
A. D. Harrison

INVENTOR:
James Hartness
by Wright Brown Crosley
Attys.

UNITED STATES PATENT OFFICE.

JAMES HARTNESS, OF SPRINGFIELD, VERMONT.

CHUCK.

SPECIFICATION forming part of Letters Patent No. 451,711, dated May 5, 1891.

Application filed July 30, 1890. Serial No. 360,405. (No model.)

*To all whom it may concern:*

Be it known that I, JAMES HARTNESS, of Springfield, in the county of Windsor and State of Vermont, have invented certain new and useful Improvements in Chucks, of which the following is a specification.

This invention relates to chucks for use in machines for making screws and analogous articles, and relates to that type of chuck employing an internally-tapered or wedge-shaped sleeve, and a series of collet-jaws having tapered backs which are inclosed by said sleeve, the jaws and sleeve being relatively movable, so that the jaws may be compressed by the co-operation of the sleeve with their wedge-shaped backs, as shown in Letters Patent No. 412,027, dated October 1, 1889, and No. 425,224, dated April 8, 1890, the present invention being an improvement on the devices shown in said patents.

In the chucks embodying the inventions patented as aforesaid the compression of the jaws is produced by a longitudinal movement of the inclosing sleeve, caused by the movement of an external operating-collar and intermediate devices interposed between the said sleeve and the chuck-spindle.

This invention has for its object to locate the jaws closer to the chuck-spindle and its main bearing than in the said patented chucks, and thereby make the chuck shorter and more compact as well as more stiff and rigid.

To this end the invention consists in the improved construction hereinafter described and claimed, adapted to effect the compression of the jaws upon the work by a longitudinal movement of the jaws into the tapered sleeve, and comprising devices to press inwardly on the outer ends of the jaws instead of outwardly on the inner end of the sleeve, as heretofore, so that the separation of the jaws from the chuck-spindle by the space heretofore required for the sleeve moving or actuating devices is avoided, and the location of the inner ends of the jaws close to the outer end of the chuck-spindle is permitted.

Figure 5:
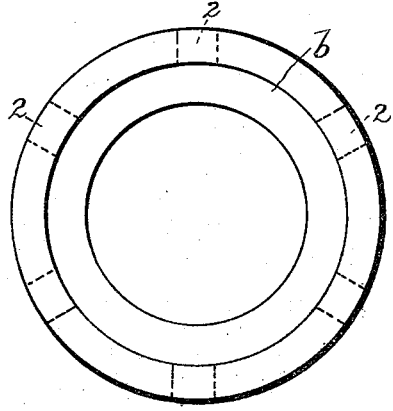
Figure 6:
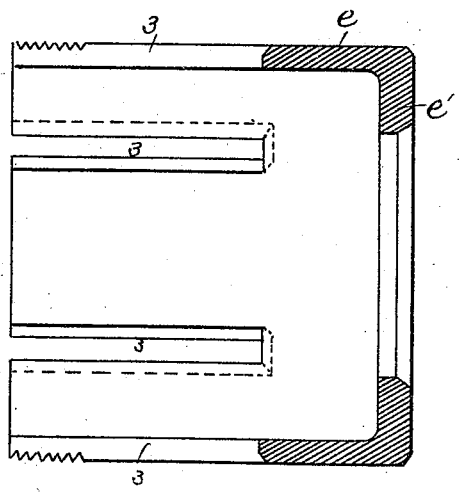

Of the accompanying drawings, forming a part of this specification, Figure 1 represents a longitudinal section of a chuck embodying my improvements, the jaws being shown as closed or compressed to hold the work. Fig. 2 represents a similar section showing the jaws released or loosened to release the work. Fig. 3 represents an end view of the chuck. Fig. 4 represents a longitudinal section of the internally-tapered sleeve inclosing the tapered back of the jaws. Fig. 5 represents an end view of said sleeve. Fig. 6 represents a longitudinal section of the sleeve which applies pressure to the outer ends of the jaws to force them into the tapered sleeve and compress or close them upon the work.

The same letters of reference indicate the same parts in all the figures.

In the drawings, $a$ represents the lathe-spindle, which may be of any suitable construction, and is of tubular form, the rod from which the screws are made being passed through the spindle, as usual in screw-machines.

$b$ represents the internally-tapered sleeve, which incloses the tapered backs of the collet-jaws $d$ $d$, the internally-tapered portion of the sleeve fitting the said tapered backs, as in the patents above mentioned. The sleeve $b$ in this improvement is provided with an internally screw-threaded extension $b'$, which is screwed onto the externally-threaded outer portion of the lathe-spindle, the sleeve having no longitudinal movement.

$e$ represents a sleeve, which incloses and is adapted to move longitudinally upon the internally-tapered sleeve $b$. Said sleeve $e$ has at its outer end an inwardly-projecting flange $e'$, which bears on the outer ends of the jaws $d$, as shown in Figs. 1 and 2, and at its inner or opposite end a collar $e^2$, which is internally screw-threaded and screwed upon the externally screw-threaded periphery of the sleeve $e$, said sleeve $e^2$ being of greater diameter than the sleeve $e$, so that its inner end constitutes a shoulder or bearing for a series of short levers or struts $f$. Said struts $f$ are inserted loosely in pockets or recesses 2, Fig. 4, formed in the periphery of the inner sleeve $b$, and project outwardly from said recesses and through longitudinal slots 3, Fig. 6, formed in the outer sleeve $e$, the outer ends of the struts being outside the periphery of the sleeve $e$ and arranged to bear on the inner end of the collar $e^2$ on said sleeve, as shown in Figs. 1 and 2. The inner ends of the struts are fulcrumed at the bottom of the pockets 2, and their outer ends are adapted to swing outwardly through the slots 3.

*g* represents an operating collar or sleeve which incloses the outer sleeve *e* and is movable lengthwise thereon, said collar *g* having a peripheral groove which receives an operating-lever, whereby the collar may be moved back and forth on the sleeve *e*. The devices for moving the collar *g* may be as shown in Fig. 10 of Patent No. 425,224, above referred to, or any other suitable operating means may be employed.

The interior of the collar *g* is enlarged at one end to form the recess 5, which receives the outer ends of the struts *f* when the collar is in the position shown in Fig. 1, the enlarged internal surface of the collar bearing on the outer edges of the struts and holding them at their extreme inward position, so that compressive endwise pressure is exerted on the struts by the bearing of their inner ends against the shouldered ends of the pockets 2 and the bearing of their outer ends on the shouldered ends of the collar $e^2$. This pressure causes the struts to hold the sleeve *e* (through the collar $e^2$ attached to the latter) at its extreme inward position, so that so long as the collar *g* is in the position shown in Fig. 1 the jaws are held closed or compressed upon the work by the sleeve *e* and its flange *e'*. When the collar *g* is moved to the position shown in Fig. 2, an enlargement 6 of its inner surface permits the outer ends of the struts to swing outwardly, thus releasing the collar $e^2$ and making the sleeve *e* loose, so that its flange no longer holds the jaws against the tapered surface of the sleeve *b*, the jaws being thus loosened to the slight extent required to enable them to release the work.

It will be seen that by applying the jaw-closing pressure to the outer ends of the jaws I am enabled to locate the jaws close to the outer end of the spindle *a*, no space being required between the jaws and spindle for the reception of the devices which transmit the jaw-closing pressure. Hence the length of the chuck is reduced to the minimum and its stiffness is correspondingly increased.

The sleeve *e* may be removed to permit the removal and replacement of the collet-jaws by unscrewing the collar $e^2$, the sleeve *e* being adapted to be withdrawn from the jaw-containing sleeve *b* when said collar is removed. The collar $e^2$ is enabled by its screw-thread connection with the sleeve *e* to be adjusted on the latter, and thus vary the extent to which said sleeve may be moved by the described action of the collar *g* and struts *f*.

The pockets 2 for the reception of the struts in the sleeve *b* are best formed, as shown in Fig. 4, by cutting a peripheral groove *i* in the exterior of the sleeve *b* and a series of grooves *i'* extending lengthwise of the sleeve from said peripheral groove, the sides of said grooves *i'* constituting the sides of the pockets, while the bottom and one side of the groove *i* at its intersection with the grooves *i'* constitute the portions of the pockets which support the ends of the struts. The struts are rounded at the outer ends to fit the correspondingly-rounded bearings provided for them in the pockets 2.

I claim—

1. The combination of the internally-tapered sleeve adapted to be attached to a spindle, the tapered jaws in said sleeve, the external sleeve inclosing and movable endwise on the jaw-containing sleeve and provided with a flange at its outer end bearing on the outer ends of the jaws, the struts or levers pivoted in pockets in the jaw-containing sleeve and bearing at their outer ends on a shoulder on the external sleeve, and the operating-collar having its inner surface formed, as described, to press the struts or levers inwardly when moved in one direction and to release said struts or levers when moved in the opposite direction, as set forth.

2. The combination of the internally-tapered sleeve adapted to be attached to a spindle, the tapered jaws in said sleeve, the external sleeve inclosing and movable endwise on the jaw-containing sleeve and provided with a flange at its outer end bearing on the outer ends of the jaws, the adjusting-collar detachably secured to the opposite end of the external sleeve, the swinging struts or levers interposed between pockets in the jaw-containing sleeve and the adjusting-collar, and the operating-collar formed, as described, to press and release said struts or levers, as set forth.

3. The internally-tapered sleeve *b*, having the peripheral groove *i* formed in its exterior, and the longitudinal grooves *i'*, extending from the groove *i*, said grooves *i i'* forming pockets and end bearings for a series of struts, combined with said struts, jaws located in the sleeve, and connections between the struts and jaws whereby the jaws may be pressed into the sleeve by movements of the struts, as set forth.

4. The struts having outer ends formed to enter and swing in corresponding bearings in a sleeve or holder, combined with said sleeve or holder, a series of jaws therein, and connections between the struts and the jaws, as set forth.

5. The sleeve *e*, having longitudinal slots 3, extending from one end partly to the other, and the inwardly-projecting flange *e'*, formed on the other end, combined with the internally-tapered sleeve *b*, the jaws in said sleeve, the struts bearing in pockets formed in the sleeve *b* and extending through the slots 3, and means for operating said struts, as set forth.

6. The operating-collar having the internal enlargements 5 6, the former presenting a surface adapted to press inwardly a series of struts within the collar, while the latter permits the outward movement of said struts, combined with the struts, an internally-tapered sleeve on which the struts bear, a series of jaws in said sleeve, and a sliding sleeve engaged with said struts and jaws and adapted to be moved by the struts to force the jaws into the tapered sleeve, as set forth.

In testimony whereof I have signed my name to this specification, in the presence of two subscribing witnesses, this 24th day of July, A. D. 1890.

JAMES HARTNESS.

Witnesses:
   E. R. FELLOWS,
   C. G. RICHARDSON.